INVENTOR.
Thomas F. Donahue
BY
Paul Fitzpatrick
ATTORNEY

May 4, 1965     T. F. DONOHUE     3,181,294
COUPLED ENGINES

Filed June 6, 1961     2 Sheets—Sheet 2

INVENTOR.
Thomas F. Donohue
BY
Paul Fitzpatrick
ATTORNEY

United States Patent Office 3,181,294
Patented May 4, 1965

3,181,294
COUPLED ENGINES
Thomas F. Donohue, Cincinnati, Ohio, assignor to General Motors Corporation, Detroit, Mich., a corporation of Delaware
Filed June 6, 1961, Ser. No. 115,265
7 Claims. (Cl. 60—39.15)

My invention relates to multiple engine power plants and particularly to arrangements for coupling a number of engines for joint operation and for common drive of accessory devices. The invention is particularly applicable to clustered installations of jet engines such as turbojet, turbo-ramjet, and air turbo-rocket engines, but the principles are applicable to other installations. The invention will be described here in connection with a cluster of four turbojet engines. In general, a jet engine used for aircraft propulsion provides some mechanical power output, but this is relatively small compared to the power represented by the propulsive jet. The shaft power withdrawn from the engine is used to drive engine accessories, such as fuel and oil pumps and governors, and also in many cases aircraft accessories, such as hydraulic servo system pumps and electrical generators.

Certain advantages may be realized by grouping or clustering engines so that a single nacelle or other housing may contain three or four engines, which may have a common air intake and a common exhaust duct and propulsion nozzle. In such an installation, the individual turbojet engines are more or less mechanically independent. One advantage of the clustered installation is the fact that it is possible to drive many of the auxiliary, accessory, or ship's service devices from the engine group rather than from individual engines. It is also possible to simplify to some extent the engine controls by co-ordinating the operation of the engines so that, in large measure, they are governed or controlled by a single master set of fuel controls and supplied by common fuel pumps, rather than the usual individual set of controls for each jet engine.

My invention is directed primarily to improved power transmission means coupling the several engines of a group or cluster of engines to a common accessory drive device or power take-off and coupling the several engines for synchronous rotation so that they are amenable to joint control. This necessitates also some means to decouple an engine if it should fail in service. This is true because the working engines should not be loaded by an inoperative engine which can absorb a great deal of power, and also because it is totally impracticable to provide an accessory drive of sufficient torque capacity to accept the load incident upon driving an inoperative engine at full speed.

My invention, therefore, is directed to an improved system and structure for rigidly clutching a number of engines together for joint operation and accessory drive, including means responsive to failure of any engine to declutch it from the common power take-off device. The nature of the invention and the advantages thereof will be apparent to those skilled in the art from the accompanying drawings and the succeeding detailed description of the preferred embodiment thereof.

Figure 1:
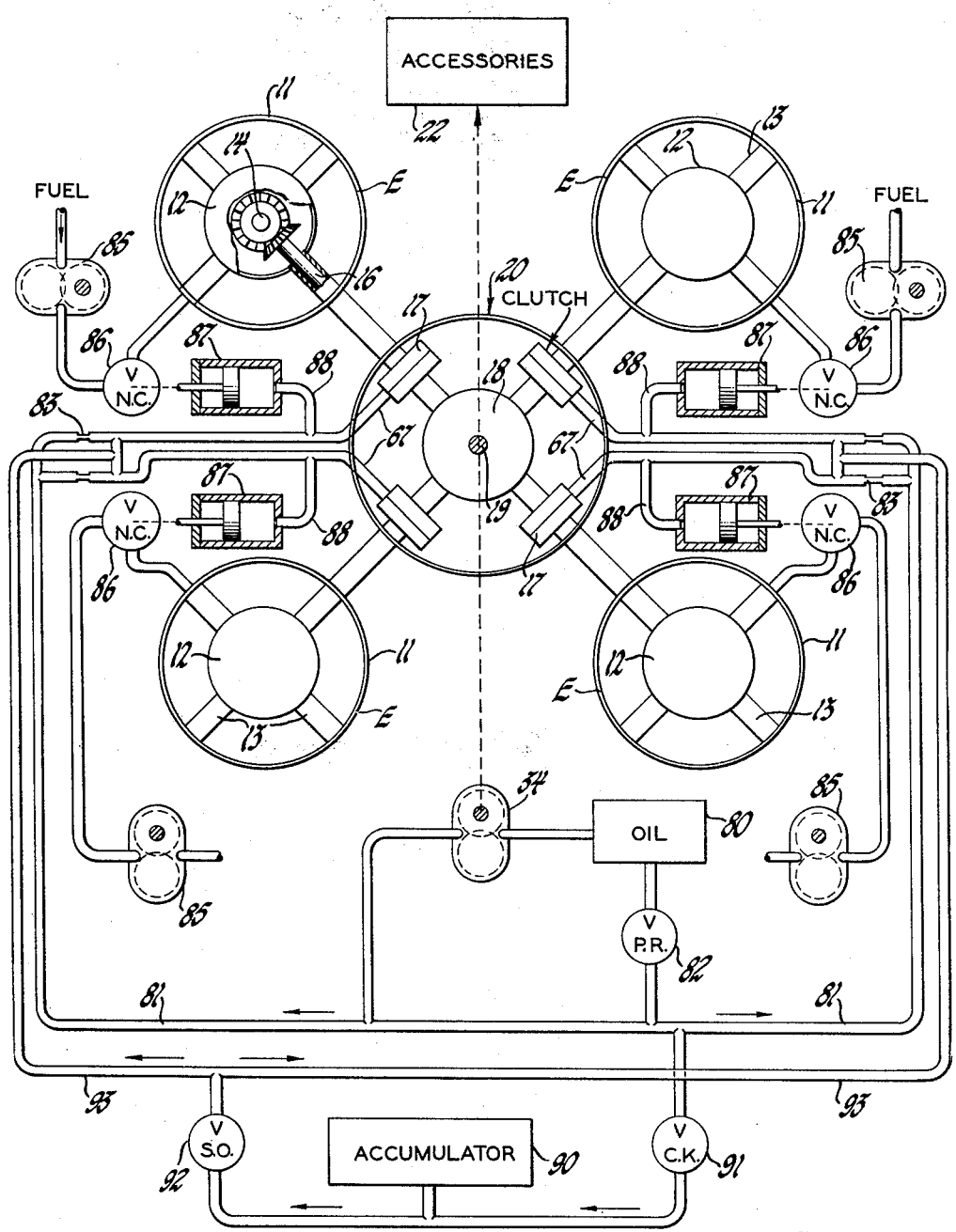
FIGURE 1 is a schematic drawing of a clustered engine installation.

Referring to FIGURE 1, the engine cluster or power plant comprises four turbojet engines E shown as viewed from the air inlet end. The engines are disposed with their axes essentially parallel and spaced 90° apart around a common central axis. The engine air inlet as shown comprises an outer shell 11, an inner fairing 12, and struts 13. These inlets preferably are supplied through a common air intake in the aircraft and the engines preferably discharge through a common exhaust system including an afterburner and a variable jet nozzle. Such matters, however, and structural details of the engines, are immaterial to this invention.

Each engine includes a power take-off gear mounted on a main engine shaft 14 which cooperates with a bevel gear mounted on a radial shaft 16 extending through one of the struts 13 and through a clutch 17 to gearing 18 which drives a main power take-off shaft 19. The clutches and gearing 17, 18 are included in a common accessory drive assembly 20 which may drive the usual accessories for the power plant and for service of the airplane such as have been referred to above, and are indicated by the block 22 in FIGURE 1.

Figure 2:
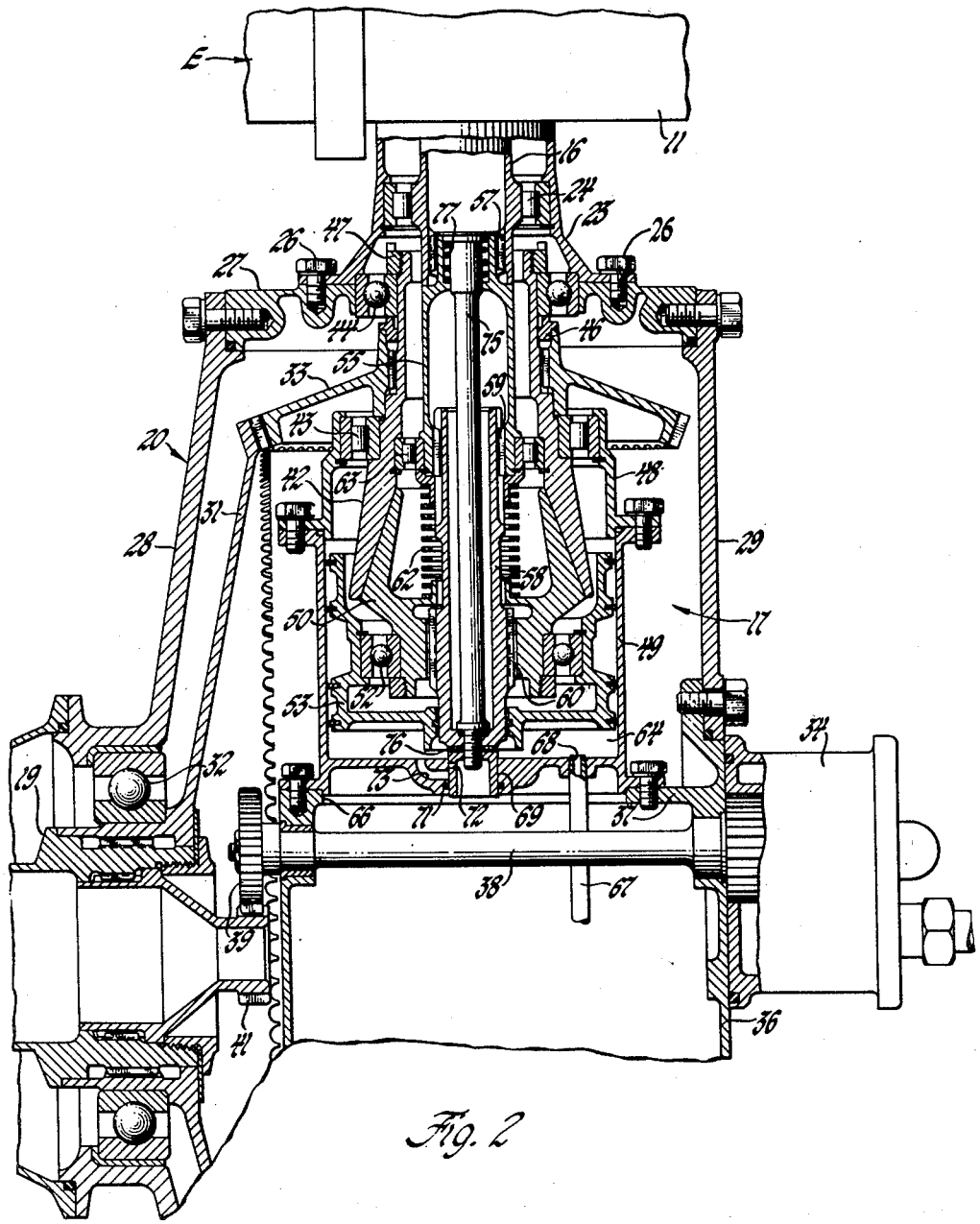
FIGURE 2 is a fragmentary sectional view of the means for coupling the engines, the view being taken on a plane containing the axes of the cluster and of one engine.

The preferred structure of the accessory drive 20 will be apparent from FIGURE 2, which is taken on a plane containing the axis of the accessory drive device and also that of one of the engines E, the outer shell 11 of which is partially shown as well as a shaft 16 already referred to. A boss 23 welded to the outer skin of the engine mounts a bearing 24 for the outer end of shaft 16 and has a flange fixed by cap screws 26 to the case 27 of the accessory drive 20. Therefore, all four engines are structurally rigid with the case 27. The case mounts front and rear covers 28 and 29. A bevel gear 31 is mounted in a ball bearing 32 in the front cover and is fixed to power take-off shaft 19 which may be coupled to the usual accessory drive housing (not shown) having mounting pads for driven accessories and means to gear them to shaft 19. The shaft 16 of each engine is coupled through the individual clutch 17 to a bevel gear 33, all of these bevel gears meshing with the gear 31.

The accessory drive 20 includes an oil pump 34 mounted on the rear cover 29 which may lubricate and scavenge the accessory drive, provide oil for operation of clutches 17, and serve any other desired purpose. The structure of the pump 34 is not material; it may be the usual gear pump. The pump 34 is mounted on a plate 36 which is bolted to the rear cover plate 29 and which is integral with a shaft housing and support member 37 of generally rectangular cross section. Member 37 supports a pump drive shaft 38 which bears a pinion 39 meshing with a pinion 41 fixed to shaft 19.

Proceeding to the structure of clutch 17 which couples shaft 16 to gear 33, gear 33 is fixed to an annular outer driven cone clutch member 42 which is rotatably mounted in bearings 43 and 44. The inner races of these bearings, the gear 33 which is splined to driven member 42, and the spacer 46 are fixed on member 42 by a nut 47. Bearing 44 is mounted in the casing 27 and bearing 43 is mounted in the outer part 48 of a housing for clutch 17 which also includes the cylinder 49 of an expansible-chamber motor. The inner driving cone clutch member 50 is mounted in a ball bearing 52 supported by expansible-chamber motor piston 53 reciprocable in the cylinder 49. The shaft 16 coupled for transmission of torque to the driving clutch member 50 through a first sleeve or hollow shaft 55 connected to shaft 16 by straight splines 57 and a second sleeve or hollow shaft 58 coupled to sleeve 55 by helical splines 59 and to clutch member 50 by helical splines 60.

Both sets of helical splines are identically pitched so that transfer of torque in the normal direction exerts an upward force on sleeve 58 and on clutch member 50. On the other hand, reverse torque, such as may occur with partial or total failure of the engine E, so that it tends to operate at a lower speed than the other engines of the group, exerts a force tending to disengage the clutch and moves sleeve 58 downwardly. It will be understood that the direction of rotation of the engine is constant. The clutch 17 is also biased toward disengagement by a compression spring 62 compressed between clutch member 50 and a retainer which bears against the inner race of a roller bearing 63 which mounts the lower end of sleeve 55 within the driven clutch member 52. The clutch member 50 is biased upwardly by piston 53, which is acted upon by hydraulic fluid such as oil in the chamber 64 in the inner end of cylinder 49. Cylinder 49 is piloted into an opening 66 in the support member 37 and bolted to it. Oil under pressure is supplied through a line 67 and port 68 into the chamber 64. The inner end of sleeve 58 extends through a bore 69 in the head of cylinder 49, a seal 71 being fitted. A radial port 72 in the end of sleeve 58 is normally closed by the cylinder head but, if the sleeve moves inwardly (downwardly as illustrated), it registers with a passage 73 in the cylinder head to vent fluid from the chamber 64 to the interior of the accessory drive from which it is ultimately removed by a scavenge pump. A shaft 75 extends through sleeves 55 and 58 and is fixed to the latter by a transverse pin 76. A preloaded compression spring 77 is retained between a head on the upper end of shaft 75 and a shoulder on the interior of sleeve 55. This spring biases port 72 away from registry with passage 73.

Oil under pressure in chamber 64 serves to overcome the thrust of spring 62 and engage the clutch. By controlling the pressure in chamber 64, the amount of reverse torque necessary to disengage the clutch may be controlled. If this amount of reverse torque is reached, the helical splines move sleeve 58 downwardly, venting the cylinder and reducing the presure so that the clutch may be held open by spring 62 and will not drag.

An exemplary system to accomplish this purpose is shown in FIGURE 1. The oil pump 34 driven by shaft 38 is indicated schematically. This pump draws oil from a tank 80 and delivers it to a servo oil line or manifold 81 extending to the several clutches 17. The pressure in line 81 is controlled by a pressure relief valve 82. The line 81 has a separate branch line 67 (see also FIGURE 2) extending to each clutch. An orifice or restriction 83 in the connection between the manifold 81 and the branch line 67 causes the reduction of pressure in cylinder 49, previously referred to, when the bleed passage 73 is opened.

This drop in pressure may also be relied upon to terminate supply of fuel to the engine and to accomplish any other functions desirable in connection with shutdown of the engine. As indicated schematically in FIGURE 1, each engine E has a source of fuel. While there may be and preferably is a common controlled source of fuel for all engines, the fuel supply for each engine is shown schematically in FIGURE 1 as a pump 85. Fuel from the pump or other source is delivered through a valve 86 to the engine. Valve 86 is of a type which is normally closed but may be held open. In this case, it is held open by an expansible-chamber motor 87 whenever the pressure in the motor is sufficient. Motor 87 is connected through a branch line 88 to the line 67 and thus is subject to the same pressure as the clutch piston 53. Thus, if the cylinder 49 is vented, pressure in line 87 is reduced and valve 86 will close completely, shutting down the engine. Individual shutdown valves such as 86 may be used with a common fuel source.

Some suitable means to engage the clutches 17 initially is needed. One way to accomplish this is to provide a source of oil under pressure such as an accumulator 90 which may be filled from manifold 81 through a check valve 91 when pump 85 is operating. Accumulator 90 is connected through a normally closed shutoff valve 92 to a manifold 93 which leads to the clutch supply lines 67. By opening valve 92, oil under pressure may be supplied to each clutch to engage all the clutches.

The operation of the system may be illustrated by a hypothetical example. Assume that the maximum accessory load to be driven through gear 31 is 400 H.P. Assume also that the clutches 17 will stay engaged up to a value of reverse torque corresponding to 500 H.P. at full engine speed. If all of the engines inherently tend to run at exactly the same speed, each should contribute 100 H.P. As a practical matter, no two engines will tend to run at exactly the same speed. The fastest engine will take over more than its share of load and the slowest engine will be unloaded to some extent. There is thus a transfer of power from the turbines of the stronger engines to help drive the compressors of the weaker engines. This power transfer will reduce the speed of the faster engines and all of the clutches 17 will remain engaged, if the transfer is moderate. However, a completely failed engine might require some thousands of horsepower to drive the engine, depending upon its size and the nature of the casualty. This is obviously too much for any reasonable power transfer case and would cripple the otherwise sound engines. With the values referred to, as soon as one engine has dropped off in power sufficiently so that it is not contributing to the drive of the accessories and is drawing 500 horsepower from the shaft at rated speed or a corresponding horsepower at a slower speed, the clutch will be disengaged and the engine will be shut down. The accessory load is then shared by the three remaining operative engines, as before.

It should be clearly understood that there is no intention to provide a set of overrunning clutches so that all of the engines operate independently, but the one which tends to run fastest will take over the entire accessory load. Any radical departure from equality of output of the engines will result in shutdown of the one which is defective.

The detailed description of the preferred embodiment of the invention for the purpose of explaining the principles thereof is not to be construed to limit or restrict the invention since many modifications may be made by the exercise of skill in the art within the scope of the invention.

I claim:

1. A clutch comprising a driving member, a driven member engageable with the driving member, the driving member normally exerting a driving torque in a particular direction on the driven member when the clutch is engaged, means coupled to transmit torque transmitted through the clutch and responsive to said torque to bias the clutch toward engagement when the torque is in the particular direction and toward disengagement when the torque is in the opposite direction, a fluid motor coupled to the clutch effective to exert an engaging force on the clutch in response to fluid pressure in the motor so that the torque-responsive means is loaded and is thus enabled to bias the clutch toward engagement and disengagement in accordance with the direction of the transmitted torque, and means responsive to disengagement of the clutch by the torque-responsive means effective to reduce the pressure in the motor so as to disable the torque-responsive means and prevent automatic reengagement of the clutch in response to a subsequent reversal of torque.

2. A clutch comprising a driving member, a driven member engageable with the driving member, the driving member normally exerting a driving torque in a particular direction on the driven member when the clutch is engaged, means coupled to transmit torque transmitted through the clutch and responsive to said torque to bias the clutch toward engagement when the torque is in the particular direction and toward disengagement when the torque is in the opposite direction, means biasing the members out of engagement, a fluid motor coupled to the clutch effective to exert an engaging force on the clutch in response to fluid pressure in the motor, means responsive to disengagement of the clutch effective to reduce the pressure in the motor below that effective to engage the clutch, and means operable to initially engage the clutch.

3. A clutch comprising a driving member, a driven member engageable with the driving member, the driving member normally exerting a driving torque in a particular direction on the driven member when the clutch is engaged, helical spline means coupled to transmit torque transmitted through the clutch and responsive to said torque to bias the clutch toward engagement when the torque is in the particular direction and toward disengagement when the torque is in the opposite direction, means biasing the members out of engagement, a fluid motor coupled to the clutch effective to exert an engaging force on the clutch in response to fluid pressure in the motor, means responsive to disengagement of the clutch effective to bleed down the pressure in the motor, and means operable to initially engage the clutch.

4. A power plant comprising, in combination, a plurality of clustered engines, a common accessory drive for the engines, a coupling means for each engine coupling the engine to the accessory drive, the plurality of coupling means thus intercoupling and synchronizing the engines, each coupling means including means for decoupling a failed engine, the said coupling means for each engine comprising a two-way clutch, means constantly operative to bias the clutch to disengaged condition, an expansible-chamber motor connected to the clutch effective to override the first-recited biasing means and bias the clutch to engaged condition, means responsive to operation of the accessory drive for supplying operating fluid to each motor to bias the respective clutch to engaged condition, and means responsive to torque transmitted by the clutch operative to bias it toward engagement when power is transmitted from the engine and bias it toward disengagement when power is transmitted to the engine.

5. A power plant comprising, in combination, a plurality of clustered engines, a common accessory drive for the engines, a coupling means for each engine coupling the engine to the accessory drive, the plurality of coupling means thus intercoupling and synchronizing the engines, each coupling means including means for decoupling a failed engine, the said coupling means for each engine comprising a two-way clutch, means constantly operative to bias the clutch to disengaged condition, an expansible-chamber motor connected to the clutch effective to override the first-recited biasing means and bias the clutch to engaged condition, means responsive to operation of the accessory drive for supplying operating fluid to each motor to bias the respective clutch to engaged condition, means responsive to torque transmitted by the clutch operative to bias it toward engagement when power is transmitted from the engine and bias it toward disengagement when power is transmitted to the engine, and means responsive to partial disengagement of the clutch operative to reduce the pressure of the operating fluid in the expansible-chamber motor.

6. A power plant comprising, in combination, a plurality of clustered engines, a common accessory drive for the engines, a coupling means for each engine coupling the engine to the accessory drive, the plurality of coupling means thus intercoupling and synchronizing the engines, each coupling means including means for decoupling a failed engine, the said coupling means for each engine comprising a two-way clutch, means constantly operative to bias the clutch to disengaged condition, an expansible-chamber motor connected to the clutch effective to override the first-recited biasing means and bias the clutch to engaged condition, means responsive to operation of the accessory drive for supplying operating fluid to each motor to bias the respective clutch to engaged condition, means responsive to torque transmitted by the clutch operative to bias it toward engagement when power is transmitted from the engine and bias it toward disengagement when power is transmitted to the engine, and optionally-operable means effective to force the clutch initially into engagement.

7. A power plant comprising, in combination, a plurality of clustered engines, a common accessory drive for the engines, a coupling means for each engine coupling the engine to the accessory drive, the plurality of coupling means thus intercoupling and synchronizing the engines, each coupling means including means for decoupling a failed engine, the said coupling means for each engine comprising a two-way clutch, means constantly operative to bias the clutch to disengaged condition, an expansible-chamber motor connected to the clutch effective to override the first-recited biasing means and bias the clutch to engaged condition, means responsive to operation of the accessory drive for supplying operating fluid to each motor to bias the respective clutch to engaged condition, means responisve to torque transmitted by the clutch operative to bias it toward engagement when power is transmitted from the engine and bias it toward disengagement when power is transmitted to the engine, and means responsive to partial disengagement of the clutch operative to disable the engine.

References Cited by the Examiner
UNITED STATES PATENTS

| | | | |
|---|---|---|---|
| 2,028,500 | 1/36 | Cook et al. | 192—41 |
| 2,314,030 | 3/43 | Bloomfield | 192—41 |
| 2,638,740 | 5/53 | Sammons | 60—39.15 |
| 2,642,971 | 6/53 | Hagenbook | 192—56 |
| 2,766,864 | 10/56 | Schilling | 192—54 |
| 2,799,375 | 7/57 | Forster | 192—54 X |
| 2,860,713 | 11/58 | Peterson | 192—54 |
| 2,893,495 | 7/59 | McDowall et al. | 192—41 X |
| 2,960,202 | 11/60 | Stevens | 192—54 |

SAMUEL LEVINE, *Primary Examiner.*

SAMUEL FEINBERG, *Examiner.*